US00RE44180E

(19) United States
(12) Reissued Patent
Cha et al.

(10) Patent Number: US RE44,180 E
(45) Date of Reissued Patent: Apr. 30, 2013

(54) SYNCHRONOUS BUCK DC/DC CONVERTER TO PERFORM AN IMPROVED SWITCHING OPERATION BY ADJUSTING VARIABLE RESISTOR

(75) Inventors: Jae-deok Cha, Yongin-si (KR); Ho-jin Seo, Hwaseong-si (KR)

(73) Assignee: SAMSUNG Electronics Co., Ltd., Suwon-si (KR)

(21) Appl. No.: 12/769,938

(22) Filed: Apr. 29, 2010

Related U.S. Patent Documents

Reissue of:
(64) Patent No.: 7,365,526
Issued: Apr. 29, 2008
Appl. No.: 11/288,324
Filed: Nov. 29, 2005

(30) Foreign Application Priority Data

Dec. 16, 2004 (KR) ..... 2004-0107117

(51) Int. Cl.
*G05F 1/575* (2006.01)
*G05F 1/618* (2006.01)

(52) U.S. Cl.
USPC ..... 323/284; 323/299

(58) Field of Classification Search ..... 323/224, 323/265, 266, 282, 284, 285, 288, 351, 299
See application file for complete search history.

(56) References Cited

U.S. PATENT DOCUMENTS 5,770,940 A * 6/1998 Goder ..... 323/282
6,141,225 A 10/2000 Gak et al.
6,614,210 B2 * 9/2003 Sundaram et al. ..... 323/354
RE38,487 E 4/2004 Isham et al.
6,844,710 B2 * 1/2005 Lipcsei et al. ..... 323/284
6,894,462 B1 * 5/2005 Fairbanks ..... 323/222
6,917,190 B2 * 7/2005 Matsuo et al. ..... 323/287
7,042,200 B2 * 5/2006 Chen et al. ..... 323/283
7,145,316 B1 * 12/2006 Galinski, III ..... 323/288

FOREIGN PATENT DOCUMENTS

| | | |
|---|---|---|
| JP | 9-84332 | 3/1997 |
| JP | 09-266664 | 10/1997 |
| JP | 10-248238 | 9/1998 |
| JP | 11-332226 | 11/1999 |
| JP | 2000-227808 | 8/2000 |
| JP | 2003-3143835 | 5/2003 |
| KR | 2001-3073 | 1/2001 |
| KR | 2001-30203 | 4/2001 |

* cited by examiner

*Primary Examiner* — Gary L Laxton
(74) *Attorney, Agent, or Firm* — Stanzione & Kim, LLP

(57) ABSTRACT

A synchronous buck DC/DC converter to perform an improved switching operation by adjusting a variable resistor is provided. The synchronous buck DC/DC converter includes a switching unit for switching two PWM signals inverted with a dead time and outputting the PWM signals, a smoothing circuit for outputting DC power using a waveform output from the switching unit as an input, a variable resistor connected to the switching unit and adjusting a switching time of the waveform output from the switching unit, and a variable resistor controller for sensing a current from an output terminal of the smoothing circuit and setting the resistance of the variable resistor to a resistance corresponding to the sensed current.

31 Claims, 7 Drawing Sheets

$R_1$
$R_2$
$R_3$

SYNCHRONOUS BUCK DC/DC CONVERTER TO PERFORM AN IMPROVED SWITCHING OPERATION BY ADJUSTING VARIABLE RESISTOR

Matter enclosed in heavy brackets [ ] appears in the original patent but forms no part of this reissue specification; matter printed in italics indicates the additions made by reissue.

CROSS-REFERENCE TO RELATED APPLICATIONS

This application claims priority from Korean Patent Application No. 10-2004-0107117 filed on Dec. 16, 2004 in the Korean Intellectual Property Office, the disclosure of which is incorporated herein by reference in its entirety.

BACKGROUND OF THE INVENTION

1. Field of the Invention

The present general inventive concept relates to a DC/DC converter, and more particularly, to a buck direct current/direct current (DC/DC) voltage converter (hereinafter, referred to as a 'converter') to perform an improved switching operation by adjusting a variable resistor according to an output current of the converter.

2. Description of the Related Art

In general, most electronic devices use a DC voltage (to power an IC semiconductor) or multiple DC voltage levels produced by an adaptor using a DC/DC converter to divide a DC voltage of a predetermined level, for example, 5 V, 3.3 V or 8 V from 12 V.

FIG. 1 is a schematic block diagram illustrating a conventional DC/DC converter 100. The DC/DC converter 100 includes a switching circuit 110, a switching controller 120, a bootstrap circuit 130, and a smoothing circuit 140.

The switching circuit 110 receives an input power and outputs a square wave having a predetermined duty ratio by a switching operation.

The switching controller 120 controls the switching operation of the switching circuit 110. In addition, the bootstrap circuit 130 is associated with the switching circuit 110 and the switching controller 120 and provides power to a circuit for driving the switching circuit 110. The smoothing circuit 140 converts the square wave output from the switching circuit 110 into a DC voltage having a predetermined value as an output power.

FIG. 2 is a detailed circuit diagram illustrating the conventional DC/Dc converter 100 of FIG. 1.

Referring to FIGS. 1 and 2, the switching circuit 110 includes a pair of FETs Q1 and Q2. Each input of the FETs Q1 and Q2 has a pulse-width modulation (PWM) signal inverted with dead time. The square wave having a predetermined duty ratio is output from an output node 112 by the switching operation. A control integral circuit (IC) is used as the switching controller 120 for controlling the switching operation of the switching circuit 110 in response to a voltage Vdc and the each input. The switching controller 120 includes a terminal HO for providing an input signal to the FET Q1, a terminal LO for providing an input signal to the FET Q2, a terminal Vcc for driving the switching controller 120, and terminals Vb and Vs for providing power used to drive the FET Q1 in the switching controller 120. In this case, a square waveform output from the terminals HO and LO is a PWM signal waveform inverted with dead time.

The bootstrap circuit 130 includes a bootstrap diode and a capacitor C1. When the output node 112 of the switching circuit 110 is grounded, that is, when the FET Q1 is turned off and the FET Q2 is turned on, charges accumulate in the capacitor C1 via the bootstrap diode from a 5V source. As such, a voltage Vbs is formed between the terminals Vb and Vs. The voltage $V_{bs}$ is used to drive the FET Q1. In general, the smoothing circuit 140 includes passive devices such as a resistor, an inductor, and a capacitor. In FIG. 2, an inductor and a capacitor are used in the smoothing circuit 140. The smoothing circuit 140 converts the square wave output from the output node 112 of the switching circuit 110 into a DC waveform to provide a predetermined DC voltage Vout.

A resistor R 122 is connected between the bootstrap circuit 130 and the switching controller 120sto control the FET Q1 of the switching circuit 110 so as to quickly perform the switching operation, which results in a high peak voltage at the output node 112 when a state of the FET Q1 is changed from an off state to an on state, and the high peak voltage may exceed a radiated EMI margin. FIG. 3 is a diagram illustrating output waveforms A and B of the switching circuit 110 of FIGS. 1 and 2 with and without a resistor R122, respectively. The waveform A is generated at the output node 112 when the resistor 122 is not used.

When the resistor R 122 is inserted between the bootstrap circuit 130 and the control IC 120. When a gate input impedance of the FET Q1 varies, a peak ringing voltage of the output node 112 can be reduced as shown in FIG. 2. The waveform B is generated at the output node 112 when the resistor R 122 is used as shown in FIG. 3. However, in this case, a switching operation time in the switching circuit 110 increases, so that a switching loss is generated.

That is, since the resistor R 122 is set to reduce the peak voltage generated at the output node 112 by a maximum load current of the converter, even when a small load current is generated in the converter, an unnecessary switching loss is generated by an increased switching time.

Thus, the peak voltage generated at the output node 112 of the switching circuit 110 is reduced, and simultaneously, the switching time of the FET Q1 can be adjusted by a load current of the converter. Thus, a method to reduce the switching loss is needed.

SUMMARY OF THE INVENTION

The present general inventive concept provides a synchronous buck DC/DC converter in which a gate impedance of a switching circuit is adjusted according to a load current of the converter so that a switching time in an output node of the switching circuit can be adjusted and a switching loss can be reduced.

Additional aspects and advantages of the present general inventive concept will be set forth in part in the description which follows and, in part, will be obvious from the description, or may be learned by practice of the general inventive concept The foregoing and/or other aspects of the present general inventive concept may be achieved by providing a DC/DC converter including a switching unit to generate a waveform according to one or more PWM signals, a smoothing circuit to output a DC power according to the waveform output from the switching unit, a variable resistor connected to the switching unit to adjust a switching time of the waveform output from the switching unit, and a variable resistor controller to sense a current from an output terminal of the smoothing circuit and to set a resistance of the variable resistor according to the sensed current.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
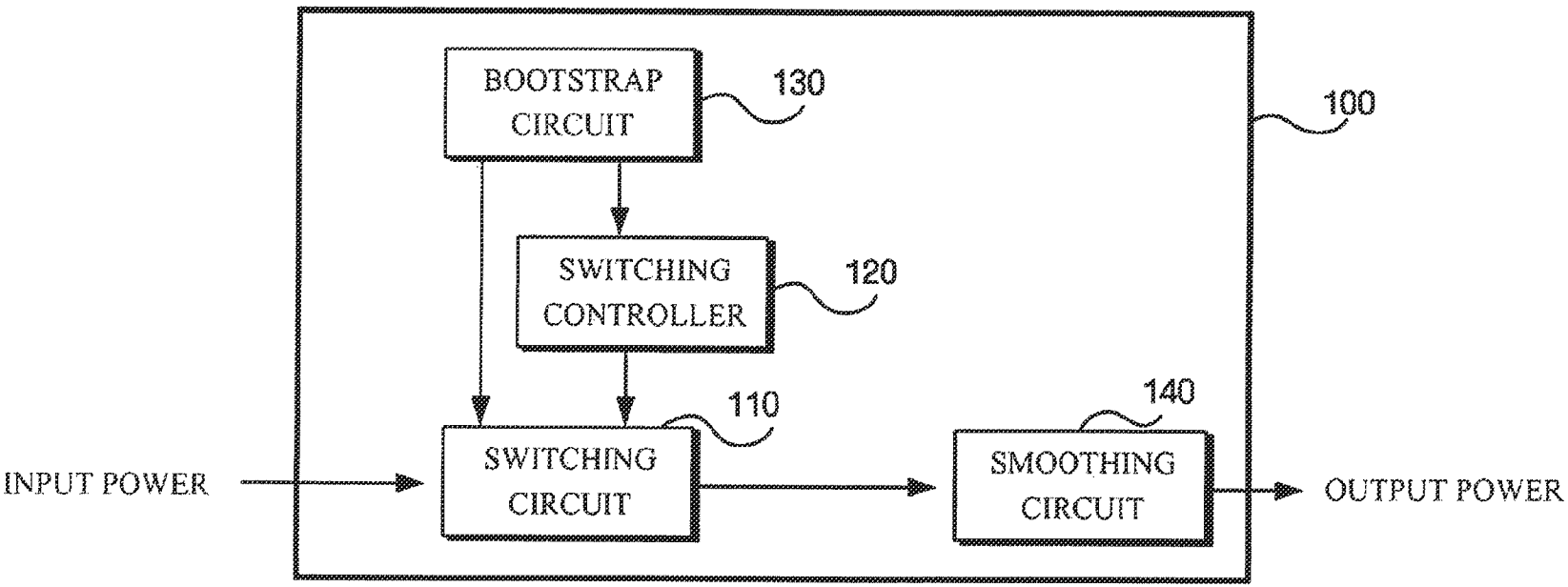
FIG. 1 (PRIOR ART)
FIG. 1 is a schematic block diagram illustrating a conventional DC/DC converter.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 4:
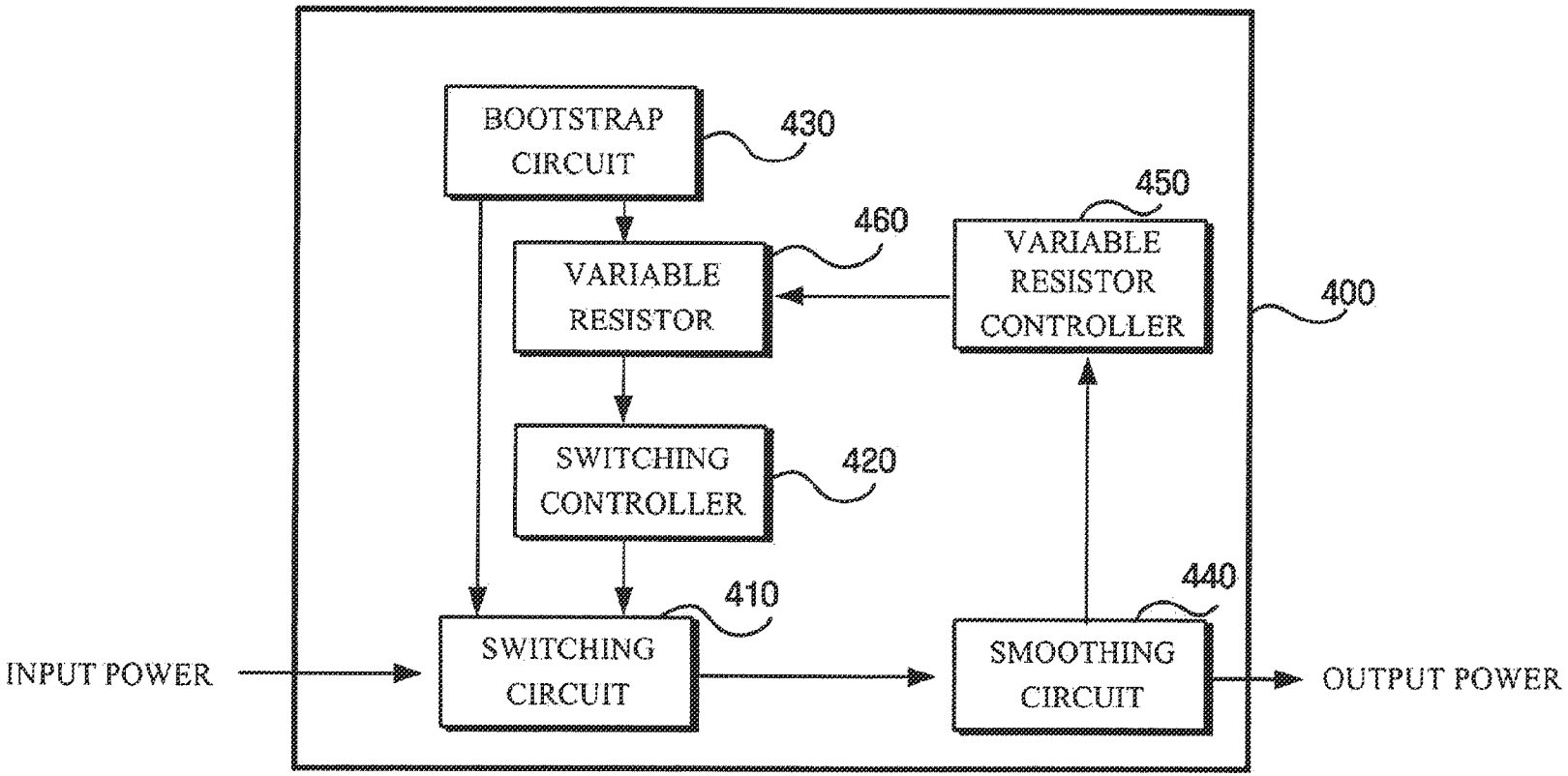
FIG. 4 is a block diagram illustrating a DC/DC converter according to an embodiment of the present general inventive concept.

FIG. 4 is a block diagram illustrating a DC/DC converter 400 according to an embodiment of the present general inventive concept.

Referring to FIG. 4, the DC/DC converter 400 includes a switching circuit 410, a switching controller 420, a bootstrap circuit 430, a smoothing circuit 440, a variable resistor controller 450, and a variable resistor 460. In this case, the switching circuit 410 and the switching controller 420 can be referred to as a 'switching unit'.

The switching circuit 410 includes a pair of FETs and outputs a square wave having a predetermined duty ratio by a switching operation. The switching controller 420 controls the switching operation of the switching circuit 410. In addition, the bootstrap circuit 430 is connected to the switching circuit 410 and the switching controller 420 and provides power to a circuit to drive at least one of the FETs of the switching circuit 410. The smoothing circuit 440 converts the square wave output from the switching circuit 410 into a predetermined DC voltage.

The variable resistor 460 may be connected between the bootstrap circuit 430 and the switching controller 460. The variable resistor 460 may include at least one of passive elements and active elements.

The variable resistor controller 450 senses a load current output from the smoothing circuit 440, that is, from an output terminal of the DC/DC converter 400, and adjusts a resistance of the variable resistor 460 to a predetermined value according to the sensed load current.

Figure 5:
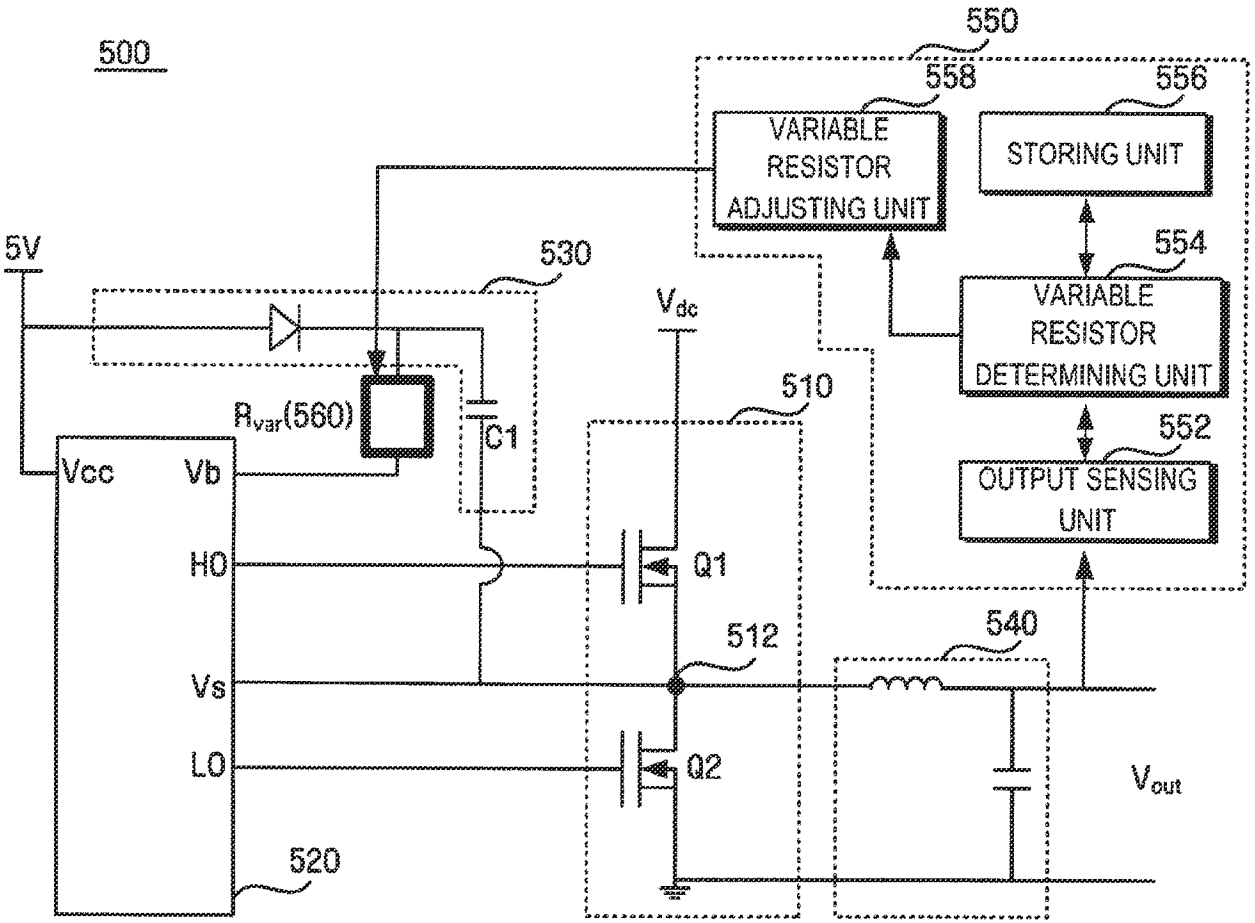
FIG. 5 is a circuit diagram illustrating the DC/DC converter of FIG. 4.

FIG. 5 is a circuit diagram illustrating a DC/Dc converter 500 according to an embodiment of the present general inventive concept. The DC/DC converter 500 of FIG. 5 may be similar to the DC/DC converter 400 of FIG. 4.

Referring to FIG. 5, a switching circuit 510 includes a pair of FETs Q1 and Q2. Each input of the FETs Q1 and Q2 has a pulse-width modulation (PWM) signal inverted with dead time. A square wave having a predetermined duty ratio is output from an output node 512 by a switching operation according to a voltage Vdc and the each input. A control integral circuit (IC) may be used as the switching controller 420 to control the switching operation of the switching circuit 510. The switching controller 520 includes a terminal HO top provide an input signal to the FET Q1, a terminal LO to provide an input signal to the FET Q2, a terminal Vcc to drive the, switching controller 520, and terminals Vb and Vs to provide power to drive the FET Q1 of the switching controller 520. In this case, a square waveform is output from the terminals HO and LO as the PWM signal converted with dead time.

The bootstrap circuit 530 may include a bootstrap diode and a capacitor C1. When the output node 512 of the switching circuit 510 is grounded, that is, when the FET Q1 is turned off and the FET Q2 is turned on, charges accumulate in the capacitor C1 via the bootstrap diode from a 5V source. As such, a voltage Vbs is formed between the terminals Vb and Vs. The voltage Vbs is used to drive the FET Q1.

The smoothing circuit 540 may include passive devices, such as a resistor, an inductor, and a capacitor. The inductor and the capacitor may be used in the smoothing circuit 540 of FIG. 5. The smoothing circuit 540 converts the square waveform output from the output node 512 of the switching circuit 510 into a DC waveform to provide a predetermined DC voltage.

Figure 2:
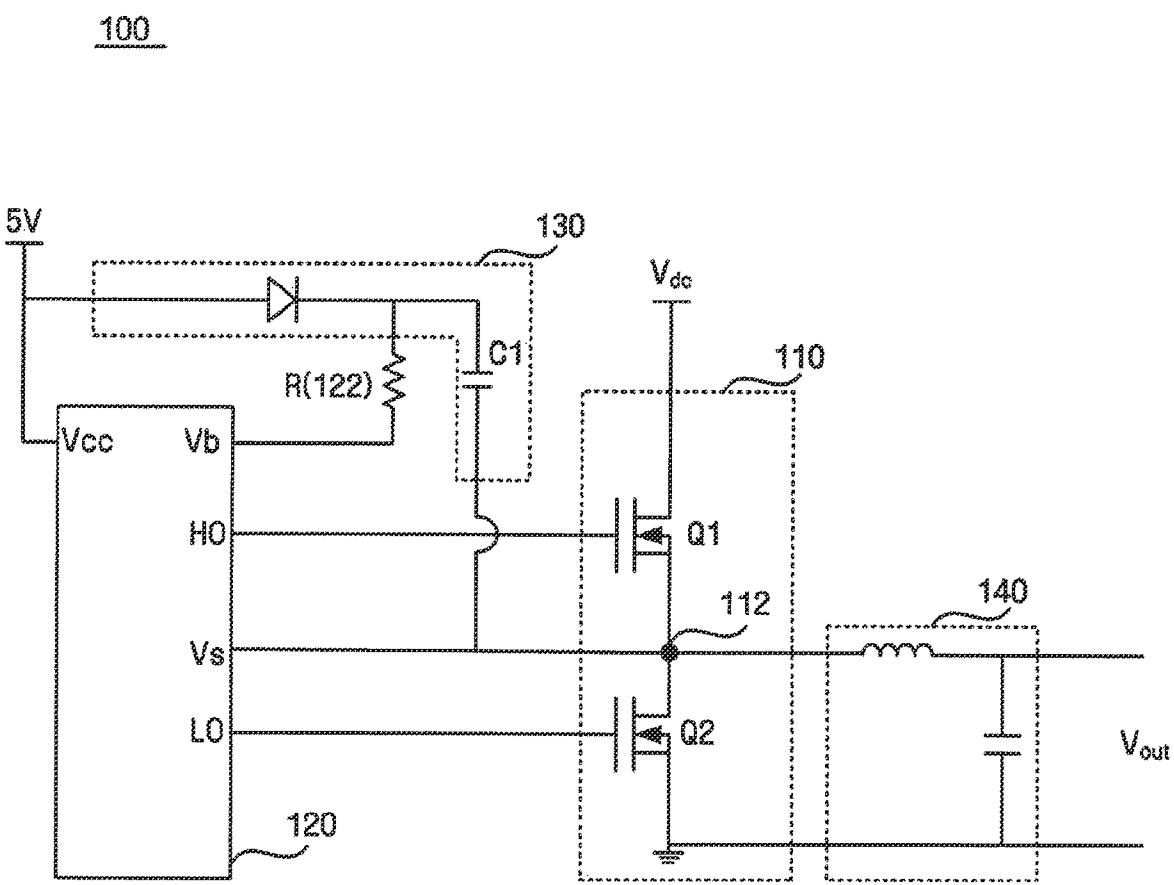
FIG. 2 (PRIOR ART)
FIG. 2 is a circuit diagram illustrating the conventional DC/DC converter of FIG. 1.
Figure 3:
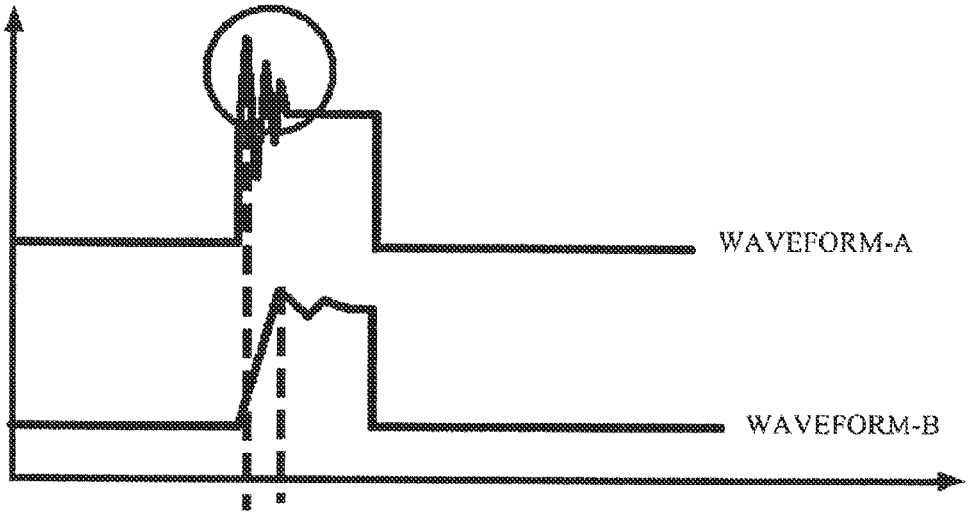
FIG. 3 (PRIOR ART)
FIG. 3 is diagrams illustrating output waveforms of a switching circuit with and without a resistor R of FIG. 2.

The above-described structure of the DC/DC converter 500 is different from the structure of the conventional DC/DC converter of FIG. 2in that instead of the resistor R 122 having a fixed resistance value, a variable resistor Rvar 560 is connected between the bootstrap circuit 530 and the switching controller 520, and the DC/DC converter according to the present embodiment is further provided with a variable resistor controller 550 to set a variable resistor Rvar 560. In this case, the variable resistor Rvar 560 may include passive elements, active elements, or a combination of passive and active elements.

In the present embodiment, the variable resistor controller 550 includes an output sensing unit 552, a variable resistor determining unit 554, a storing unit 556, and a variable resistor adjusting unit 558.

The output sensing unit 552 senses a load current from an output terminal of the smoothing circuit 540, that is, from an output terminal of the DC/DC converter 500, and transmits the sensed load current to the variable resistor determining unit 554.

Figure 6A:
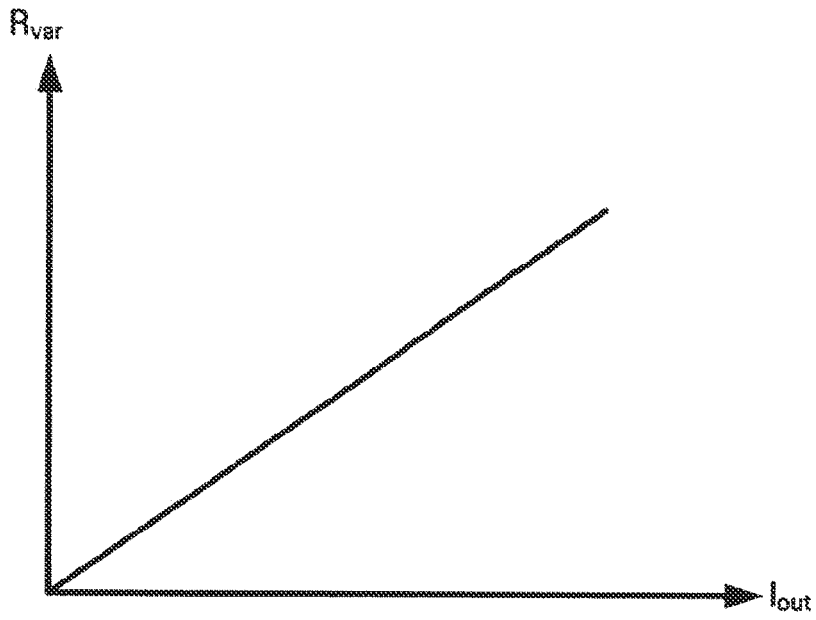
FIGS. 6A and 6B are diagrams illustrating a load current $I_{out}$ and a variable resistor $R_{var}$ of the DC/DC converter of FIG. 4.
Figure 6B:
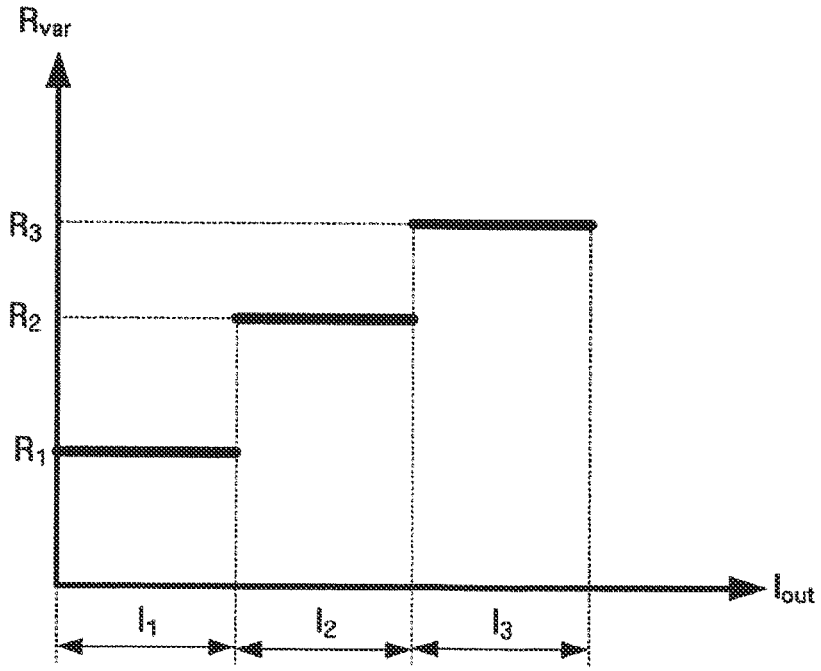

A value of the variable resistor Rvar 560 may be set according to the load current of the converter 500 is stored in the storing unit 556. Here, the load current may be proportional to the resistance of the variable resistor Rvar 560, as shown in FIG. 6A. In other words, as the load current lout increases, the resistance of the variable resistor Rvar 560 increases. It is possible that the resistance of the variable resistor Rvar 560 may be set to predetermined values according to predetermined ranges of the load current. That is, as shown in FIG. 6B, when the load current lout is in a range $I_1$, the resistance of the variable resistor Rvar 560 is set to R1, when the load current lout is in a range $I_2$, the resistance of the variable resistor Rvar 560 is set to R2, and when the load current Iout is in a range $I_3$, the resistance of the variable resistor Rvar 560 is set to R3.

The variable resistor determining unit 554 extracts a resistance value of the variable resistor Rvar 560 from the storing unit 556 using the load current sensed by the output sensing unit 552, and transmits the extracted resistance value to the variable resistor adjusting unit 558. The variable resistor determining unit 558 adjusts the resistance of the variable resistor Rvar 560 according to the extracted resistance value.

Thus, the value of the variable resistor Rvar 560 varies according to the load current so that a switching time of the switching circuit 510 varies.

Figures 7A, 7B, 7C:
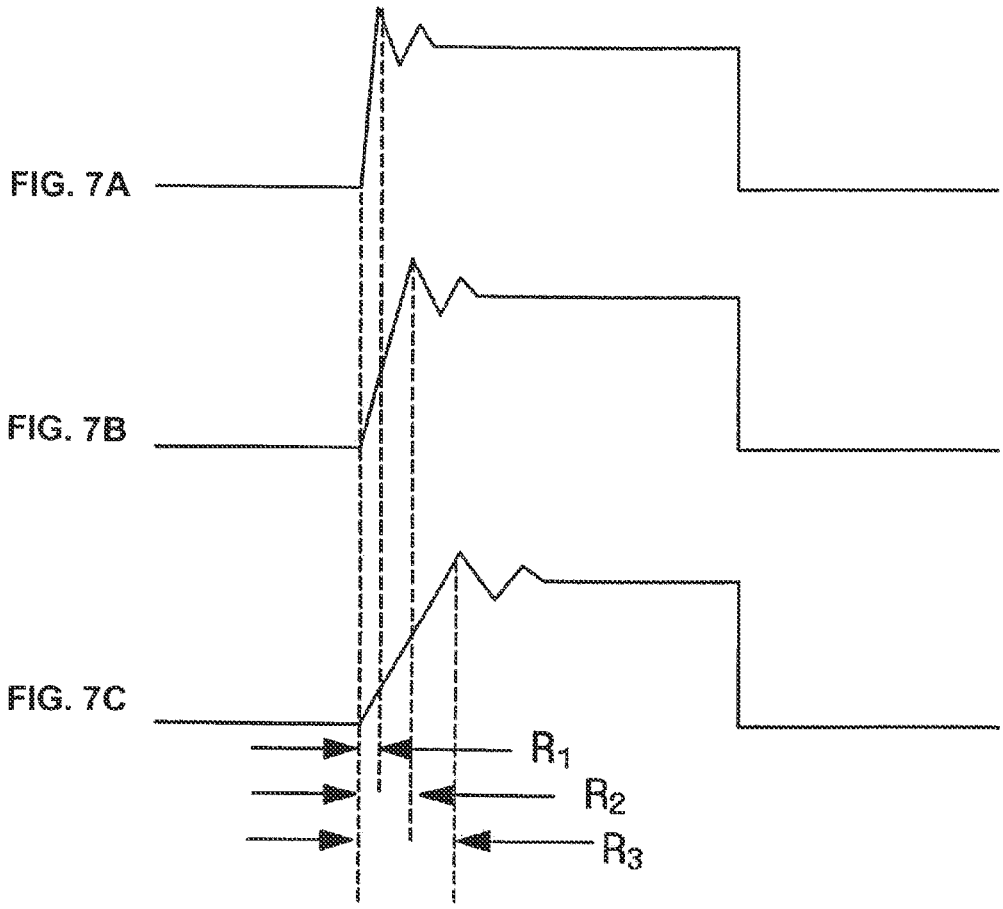
FIGS. 7A through 7C are diagrams illustrating output waveforms of a switching circuit depending on a change of a variable resistor in the DC/Dc converter of FIG. 4.

FIGS. 7A through 7C are diagrams illustrating output waveforms of a switching circuit depending on a change of a variable resistor in the DC/DC converter 400 and 500 of FIGS. 4 and 5.

Here, $I_1<I_2<I_3$ and $R_1<R_2<R_3$.

FIG. 7A shows a waveform generated at the output node 512 of the switching circuit 510 when the load current is $I_1$, and the value of the variable resistor Rvar 560 is set to $R_1$; FIG. 7B shows a waveform generated at the output node 512 of the switching circuit 510 when the load current is $I_2$, and the value of the variable resistor Rvar 560 is set to $R_2$; and FIG. 7C shows a waveform generated at the output node 512 of the switching circuit 510 when the load current is $I_3$, and the value of the variable resistor Rvar 560 is set to $R_3$.

In other words, even though the load current decreases, the value of the variable resistor Rvar 560 is adjusted so that a peak voltage generated at the output node 512 of the switching circuit 510 can be reduced, and simultaneously, the switching time can be reduced and a switching loss can be accordingly reduced. Although a rising time corresponding to the value of the variable resistor Rvar 560 varies according to the load current, a falling time of the square wave may not be changed, that is, a period of the square wave between a starting point of the rising time and an end point of the falling time may not be changed but remain same. In addition, a peak voltage of the waveform in the rising time is not changed.

As described above, in the synchronous buck DC/DC converter according to the present embodiment, a peak ringing voltage generated by a switching operation performed by the switching circuit of the converter is reduced and a switching time is adjusted according to the load current of the converter so that a switching loss generated in the switching circuit can be reduced.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A DC/DC converter comprising:

a switching unit to output a waveform having a first rising time according to a plurality of PWM signals corresponding to a plurality of power sources;

a smoothing circuit to output a DC power according to the waveform output from the switching unit;

a variable resistor connected to the switching unit to adjust a switching time of the waveform output from the switching unit *and to adjust one of the plurality of power sources supplied to the switching unit*; and a variable resistor controller to sense a load current from an output terminal of the smoothing circuit and to set a resistance of the variable resistor according to the sensed current *so that the switching unit generates an adjusted switching time according to the adjusted one of plurality of power sources*, wherein the smoothing circuit outputs another waveform having a second rising time according to the set resistance of the variable resistor *and according to the adjusted switching time of the waveform output from the switching unit*.

2. The DC/DC converter of claim 1, wherein the switching unit comprises:

a switching circuit having a pair of field effect transistors (FETs) to output a square wave having a predetermined period as the waveform by a switching operation; and a switching controller to control the switching operation of the switching circuit.

3. The DC/DC converter of claim 1, wherein the variable resistor controller comprises:

an output sensing unit to sense the load current from the output terminal of the smoothing circuit; and a variable resistor determining unit to determine a predetermined resistance corresponding to the sensed load current; and a variable resistor adjusting unit to [sent] *set* the resistance of the variable resistor to the determined resistance.

4. The DC/DC converter of claim 3, wherein the variable resistor determining unit determines the resistance to be proportional to the sensed load current.

5. The DC/DC converter of claim 3, wherein the variable resistor determining unit determines the resistance corresponding to a predetermined range of the sensed load current.

6. The DC/DC converter of claim 3, wherein the variable resistor controlling unit further comprises:

a storing unit to store information about the load current sensed by the output sensing unit and [a] *the* resistance corresponding to the load current.

7. The DC/DC converter of claim 1, further comprising:

a bootstrap circuit connected to the switching circuit to provide power to drive the switching circuit.

8. The DC/DC converter of claim 1, wherein the variable resistor comprises:

at least one of passive elements, active elements, and a combination of the passive and active elements.

9. The DC/DC converter of claim 1, wherein the DC/DC converter comprises a synchronous buck DC/DC converter.

10. A DC/DC converter comprising:

a switching controller to generate a switching signal according to a first power source;

a switching circuit to output a waveform according to the switching signal and a second power source;

a smoothing circuit to output a DC power according to the waveform output from the switching circuit;

a variable resistor connected between the switching controller and the first power source to adjust the first power source supplied to the switching controller; and a variable resistor controller to sense a load current of the smoothing circuit and to change a resistance of the variable resistor to generate the adjusted first power source according to the sensed load current, so that the switching controller generates a modified switching signal according to the adjusted first power source, the switching circuit outputs a second waveform according to the modified switching signal, and the smoothing circuit outputs a second DC Power according to the second waveform.

11. The DC/DC converter of claim 10, further comprising:

a bootstrap circuit -disposed between the first power source and the switching controller to supply a voltage to the switching controller, wherein the switching controller generates the switching signal according to the voltage.

12. The DC/DC converter of claim 11, wherein the variable resistor is disposed between the bootstrap circuit and the switching controller.

13. The DC/DC converter of claim 11, wherein the switching circuit comprises an output terminal to output the waveform, and the bootstrap circuit comprises a capacitor connected between the first power source and the output terminal of the switching circuit.

14. The DC/DC converter of claim 10, wherein:

the load current comprises a first load current and a second load current; and the waveform comprises a first waveform having a first rising time and a first peak voltage in the first rising time, and a second waveform having a second rising time and a second peak voltage in the second rising time, in response to the first load current and the second load current, respectively.

15. The DC/DC. converter of claim 10, wherein a first peak voltage and a second peak voltage are same.

16. The DC/DC converter of claim 10, wherein the waveform comprises a first waveform and a second waveform having a first period and a second period, the first and second periods being identical.

17. The DC/DC converter of claim 10, wherein:

the load current comprises a first load current and a second load current;

the resistance of the variable resistor comprises a first resistance and a second resistance according to the first and second load currents, respectively; and the waveform comprises a first waveform having a first rising time and a first peak voltage in the first rising time, and a second waveform having a second rising time and a second peak voltage in the second rising time, according to the first resistance and the second resistance, respectively.

18. A DC/DC converter comprising:

a switching controller to generate a switching signal according to a first power source;

a switching circuit to output a first waveform having a first risina time according to the switching signal and a second power source;

a smoothing circuit to output a DC power according to the *first* waveform output from the switching circuit; and a controller to detect a characteristic of the smoothing circuit with respect to the output DC power and to control the switching circuit according to the characteristic of the smoothing circuit to output the first waveform having the first rising time and a first peak voltage in the first rising time, and a second waveform having a second rising time and a second peak voltage in the second rising time, [as the waveform] *and the controller to generate a modified switching signal when the first power source that supplies the switching controller is adjusted*, wherein the smoothing circuit outputs another DC power according to the second waveform *and according to the control of the switching circuit by the controller*.

19. The DC/DC converter of claim 18, further comprising:

a bootstrap circuit connected between the first power source and the switching controller to supply a voltage to the switching controller; and a variable resistor disposed between the bootstrap circuit and the switching controller to adjust the voltage according to the detected characteristic of the smoothing circuit.

20. The DC/DC converter of claim 18, wherein the characteristic of the smoothing circuit comprises a load current.

21. The DC/DC converter of claim 18, wherein a first peak voltage and a second peak voltage are substantially same.

*22. A DC/DC converter comprising:*

*a variable resistor;*

*a switching unit coupled to the variable resistor to output a first waveform having a first rising time according to (i) a plurality of PWM signals corresponding to a plurality of power sources and (ii) a first resistance value provided by the variable resistor; and*

*a smoothing circuit to output a DC power according to the first waveform output from the switching unit,*

*wherein a resistance of the variable resistor coupled to the switching unit is changeable to adjust a switching time of the first waveform output from the switching unit and to adjust the at least one power source of the plurality of power sources,*

*wherein the switching unit outputs a second waveform having a second rising time when the resistance of the variable resistor is changed from the first resistance value to a second resistance value and according to the adjusted switching time of the first waveform output from the switching unit.*

*23. The DC/DC converter of claim 22, wherein the variable resistor controller is configured to sense a load current from an output terminal of the smoothing circuit and to set a resistance of the variable resistor according to the sensed current.*

*24. The DC/DC converter of claim 22, wherein the switching unit comprises:*

*a switching circuit having a pair of field effect transistors (FETs) to output a square wave having a predetermined period as the first waveform or the second waveform by a switching operation; and*

*a switching controller to control the switching operation of the switching circuit.*

*25. The DC/DC converter of claim 22, wherein the variable resistor controller comprises:*

*an output sensing unit to sense the load current from the output terminal of the smoothing circuit; and*

*a variable resistor determining unit to determine a predetermined resistance corresponding to the sensed load current; and*

*a variable resistor adjusting unit to sent the resistance of the variable resistor to the determined resistance.*

*26. The DC/DC converter of claim 25, wherein the variable resistor determining unit determines the resistance to be proportional to the sensed load current.*

*27. The DC/DC converter of claim 25, wherein the variable resistor determining unit determines the resistance corresponding to a predetermined range of the sensed load current.*

*28. The DC/DC converter of claim 25, wherein the variable resistor controlling unit further comprises:*

*a storing unit to store information about the load current sensed by the output sensing unit and the resistance corresponding to the load current.*

*29. The DC/DC converter of claim 22, further comprising:*

*a bootstrap circuit connected to the switching circuit to provide power to drive the switching circuit.*

*30. The DC/DC converter of claim 22, wherein the variable resistor comprises:*

*at least one of passive elements, active elements, and a combination of the passive and active elements.*

*31. The DC/DC converter of claim 22, wherein the DC/DC converter comprises a synchronous buck DC/DC converter.*

* * * * *